United States Patent Office.

SALOMON HEIMANN, OF NEW YORK, N. Y.

PROCESS OF TREATING PEAT.

SPECIFICATION forming part of Letters Patent No. 337,495, dated March 9, 1886.

Application filed January 8, 1886. Serial No. 187,988. (No specimens.) Patented in Belgium March 31, 1882, No. 57,289; in England September 8, 1882, No. 4,281, and in France November 6, 1882, No. 139,705.

*To all whom it may concern:*

Be it known that I, SALOMON HEIMANN, of the city of New York, county and State of New York, have invented a new and Improved Process of Treating Peat, (for which I have obtained patents in Great Britain No. 4,281, dated September 8, 1882; France No. 139,705, dated November 6, 1882, and Belgium No. 57,289, dated March 31, 1882,) of which the following is a specification.

This invention relates to improvements in the treatment of peat in order to adapt it to the manufacture of paving material and various articles of industry and commerce. By my method of utilizing peat moor, which is otherwise of little or no value, it is rendered useful, and an entire new branch of industry is formed.

For making paving-stones, drain-pipes, railway-sleepers, and similar articles, the process is carried out in the following manner: The peat is cut direct from the peat moor or bog and pressed in order to partly free it of water, and thus reduce the expense of transport and facilitate the after operation of drying. The peat is then thoroughly dried in a suitable drying apparatus, ground in a mill, and afterward mixed with from fifteen to twenty-five per cent. of the refuse of aniline-works.

In order to insure the proper mixing of the peat with the refuse of aniline-works, which consists of a species of slag, the said refuse is melted in a boiler provided with suitable mixing apparatus, and the requisite proportion of peat is supplied to the same, the proportion of peat being regulated according to the quality of the same and the articles intended to be produced. The mixing is continued until a thoroughly homogeneous material is produced, and then the mass is poured into the molds.

In order to produce a greater solidity of the stones, they can be pressed until they are smooth on all sides, and the formation of air-holes and blisters is prevented.

In order to pave streets in a similar manner to that of asphalt, the boiling and mixing is done in transportable boilers on the spot. After the mass is properly mixed it is poured upon the roadway, and (similar to asphalt) smoothed by means of hot rollers, smoothing-irons, or other suitable means.

When the peat is prepared in the manner hereinbefore described, it becomes stone hard, is uninjured by the weather, and impervious to water.

In order to prepare the peat for the manufacture of cigar and other boxes, the inner and outer soles of boots and shoes, and for analogous purposes, the peat is, as before, pressed and dried, and then, either by itself or mixed with ten per cent. of diluted silicate of potassa, it is compressed until the mass becomes so solid that its volume is decreased by at least twenty-five per cent. The material produced in this manner is very hard, and can be operated upon with saw and plane or other tools in a similar manner to that in which wood is worked. If the peat has not been mixed with silicate of potassa, the product after compression can be hammered or stamped to the desired shape, and then coated or impregnated with silicate of potassa. By these means the peat acquires a degree of hardness similar to that of wood, so that locks and hinges can be fixed to the same. The surface can also be painted or polished. This material is specially adapted for the soles of boots and shoes, as it keeps the feet warm and dry. The peat thus prepared is also adapted for use as a substitute for pasteboard and paper, and when used for this purpose it is colored with clay colors or fruit-juices.

Articles manufactured from this material can be made much cheaper than when manufactured from the ordinary materials hitherto used for similar purposes.

I am aware that it is not new to mix peat with metal slag, tar, and resinous substances, such compositions being described in English Patents No. 4,273 of 1876 and 845 of 1877.

My invention has reference particularly to the mixing of peat with aniline slag, as I have found that the latter substance is particularly adapted for admixture with peat, inasmuch as it produces an elastic or flexible composition which easily takes color. I therefore do not broadly claim the admixture of peat with slag; but I do claim—

The process of treating peat, which consists in pressing, drying, and grinding the peat, then mixing it in a heated condition with slag of aniline-works, and then casting it in molds, substantially as specified.

SALOMON HEIMANN.

Witnesses:
F. V. BRIESEN,
ROBT. H. ROY.